United States Patent
Hartman (10) Patent No.: US 6,474,929 B1
(45) Date of Patent: Nov. 5, 2002

(54) LINEAR INCLINE LIFT AND DUMP DEVICE

(76) Inventor: Michael Robert Hartman, 1925 Crenshaw Blvd. Space 33, Torrance, CA (US) 90501

( * ) Notice: Subject to any disclaimer, the term of this patent is extended or adjusted under 35 U.S.C. 154(b) by 0 days.

(21) Appl. No.: 09/277,437

(22) Filed: Mar. 26, 1999

(51) Int. Cl.[7] .............................................. B65G 65/23
(52) U.S. Cl. ........................ 414/422; 414/425; 414/598
(58) Field of Search .............................. 414/419, 421, 414/422, 424, 425, 595, 598, 639, 641, 10; 187/244, 245

(56) References Cited

U.S. PATENT DOCUMENTS

| | | | |
|---|---|---|---|
| 740,475 A | * 10/1903 | Serley .......................... | 187/244 |
| 1,099,220 A | * 4/1914 | Koch et al. | |
| 1,668,500 A | * 5/1928 | Gillespie ..................... | 187/244 |
| 2,042,489 A | * 6/1936 | Williams | |
| 2,588,458 A | * 3/1952 | Allphin et al. | |
| 2,624,480 A | * 1/1953 | Bartling ....................... | 414/595 |
| 2,888,157 A | * 5/1959 | Riley ...................... | 414/422 X |
| 3,380,603 A | * 4/1968 | Collins .................... | 414/598 X |
| 3,592,294 A | * 7/1971 | Allen .......................... | 187/245 |
| 3,891,062 A | * 6/1975 | Geneste ....................... | 187/245 |
| 4,249,848 A | * 2/1981 | Griffin et al. ........... | 414/595 X |
| 4,279,562 A | * 7/1981 | Cormier et al. .......... | 414/598 X |
| 4,599,035 A | 7/1986 | Goodlad et al. ............. | 414/697 |
| 4,793,437 A | * 12/1988 | Hanthorn .................... | 182/102 |
| 4,917,796 A | * 4/1990 | Rudzinski ............... | 414/425 X |
| 5,039,271 A | 8/1991 | Jullian ......................... | 414/436 |
| 5,052,521 A | * 10/1991 | Wendt et al. ............... | 187/245 |
| 5,205,699 A | * 4/1993 | Habicht ................... | 414/422 X |
| 5,340,082 A | * 8/1994 | Holloway ..................... | 254/88 |
| 5,364,224 A | 11/1994 | Padgett ........................ | 414/703 |
| 5,474,379 A | * 12/1995 | Perry ....................... | 414/598 X |
| 6,113,340 A | * 9/2000 | Zalal ........................... | 414/598 |

FOREIGN PATENT DOCUMENTS

| | | | |
|---|---|---|---|
| DE | 1171369 | * 6/1964 | ................. 414/421 |
| DE | 2214791 | * 10/1973 | ................. 414/421 |
| DE | 3517291 | * 11/1986 | ................. 187/245 |
| DE | 3634701 | * 4/1988 | ................. 187/244 |
| DE | 3710010 | * 9/1988 | ................. 187/244 |
| DE | 3717662 | * 12/1988 | ................. 187/245 |
| EP | 291739 | * 11/1988 | ................. 187/244 |
| GB | 2234956 | * 2/1991 | ................. 414/421 |

* cited by examiner

Primary Examiner—James W. Keenan
(74) Attorney, Agent, or Firm—Steins & Associates, P.C.

(57) ABSTRACT

A device in which a lifting hopper (82) traverses up along inclined rails (16L) and (16R) and dumps a load into a receptacle of some nature. The lifting hopper (82) will accept a variety of material and debris laden carts, tilt trucks, and wheel barrows. No modifications or special attachments are needed to use the various carts, tilt trucks, and wheel barrows. The loaded cart, tilt truck or wheel barrow positions in the lifting hopper and secures in place. The lifting hopper (82) traverses up along incline rails (16L) and (16R), rotates and dumps, then returns to the original position ready for another cycle. Material or debris may load directly into the lifting hopper (82) without the use of a cart, tilt truck, or wheel barrow when wheel (58) extends the dumping device can reposition around the material or debris receptacle, or loaded onto a truck or trailer and transported to a different site.

8 Claims, 6 Drawing Sheets

LINEAR INCLINE LIFT AND DUMP DEVICE

BACKGROUND

1. Field of Invention

This invention relates to dumping devices. Specifically devices that will lift and dump a variety of carts, tilt trucks, wheel barrows and the like.

2. Description of Prior Art

Devices that will dump a variety of carts, tilt trucks and wheel barrows loaded with debris or materials are minimal. Such devices are also proprietary as they only accommodate a cart or tilt truck manufactured or modified for the dumping device.

Most dumping devices are of stationary installation and operation. Stationary mounting and operation limit such dumping devices. By not being portable the dumping device could create additional work or costs in debris or material handling. Several devices are portable in operation but only dump carts and tilt trucks that a proprietary for the specific device.

OBJECTS AND ADVANTAGES

Accordingly, several objects and advantages of my invention are:

(a) to provide a dumping device that accepts a variety of carts, tilt trucks and wheel barrows and the like; and (b) to provide a dumping device that accepts a variety of carts, tilt trucks and wheel barrows and the like without the need to change or add special attachments to the dumping device; and (c) to provide a dumping device that accepts a variety of carts, tilt trucks, and wheel barrows without the need to modify or add special attachments to the carts, tilt trucks, and wheel barrows; and (d) to provide a dumping device that accepts a variety of carts, tilt trucks and wheel barrows and the like which is portable.

Still further objects and advantages will become apparent from a consideration of the ensuing description and accompanying drawings.

REFERENCE NUMERALS 10L base
10R base
11 lifting connector
13 bumper
14 vertical support
15 trailer attachment aperture
16L incline rail
16R incline rail
17 dump initiator
18 rail stiffener
19B movement sensing device
19U movement sensing device
20B rear horizontal brace
20U rear horizontal brace
21 eye bracket
22 horizontal side brace
23 vertical guard
25 pull handle
26 gearmotor horizontal support
27 side guard
28 gearmotor vertical support
29 hopper return roller
30 jack mounting plate
32 jack
34 connector plate
36 connector rod
37 wheel safety switch tab
38 shaft tab
39 safety switch
40 shaft
41 mounting angle
42 bearing block
43 end bearing block
44 mounting block
45 extension lever
50 wheel mounting shaft
51 extension release rod
54 pushrod
56 wheel rotating plate
58 wheel
59 sprocket bolt
60 bottom rail sprocket
61B lifting sprocket
61U lifting sprocket
62 mid brace sprocket
63 lifting sprocket attachment plate
64 brace sprocket
66 top rail sprocket
67 sprocket mounting plate
68 gearmotor mounting plate
70 gearmotor
71 drive shaft
76 drive sprocket
78L roller lifting component
78R roller lifting component
80 chain
81 chain shock absorber
82 lifting hopper
84 hopper shaft
86 shaft end mounting plate
88 roller lifting extension arm
90 outside plate
91 inside plate
92 latch
93 roller bolt
94B bottom roller
94U upper roller
95 roller guide assembly
96 hopper bottom plate
98L hopper side
98R hopper side
99 hopper back
100 hopper latch receiver
101 front load securing plate 102 load securing mechanism
103 securing mechanism actuator
104 hopper rim
106 rear hopper load securing mechanism
108C protective enclosure
108D protective enclosure
108E protective enclosure
108F protective enclosure
108G protective enclosure
108H protective enclosure
108J protective enclosure
108K protective enclosure

SUMMARY

In accordance with the present invention a dumping device that will accept various carts, tilt trucks, and wheel barrows without the need of modifications or special attachments to the various carts, tilt tucks, wheel barrows, and or the dumping device. In addition, the dumping device is portable as it easily repositions or moves to a different location.

Figure 1:
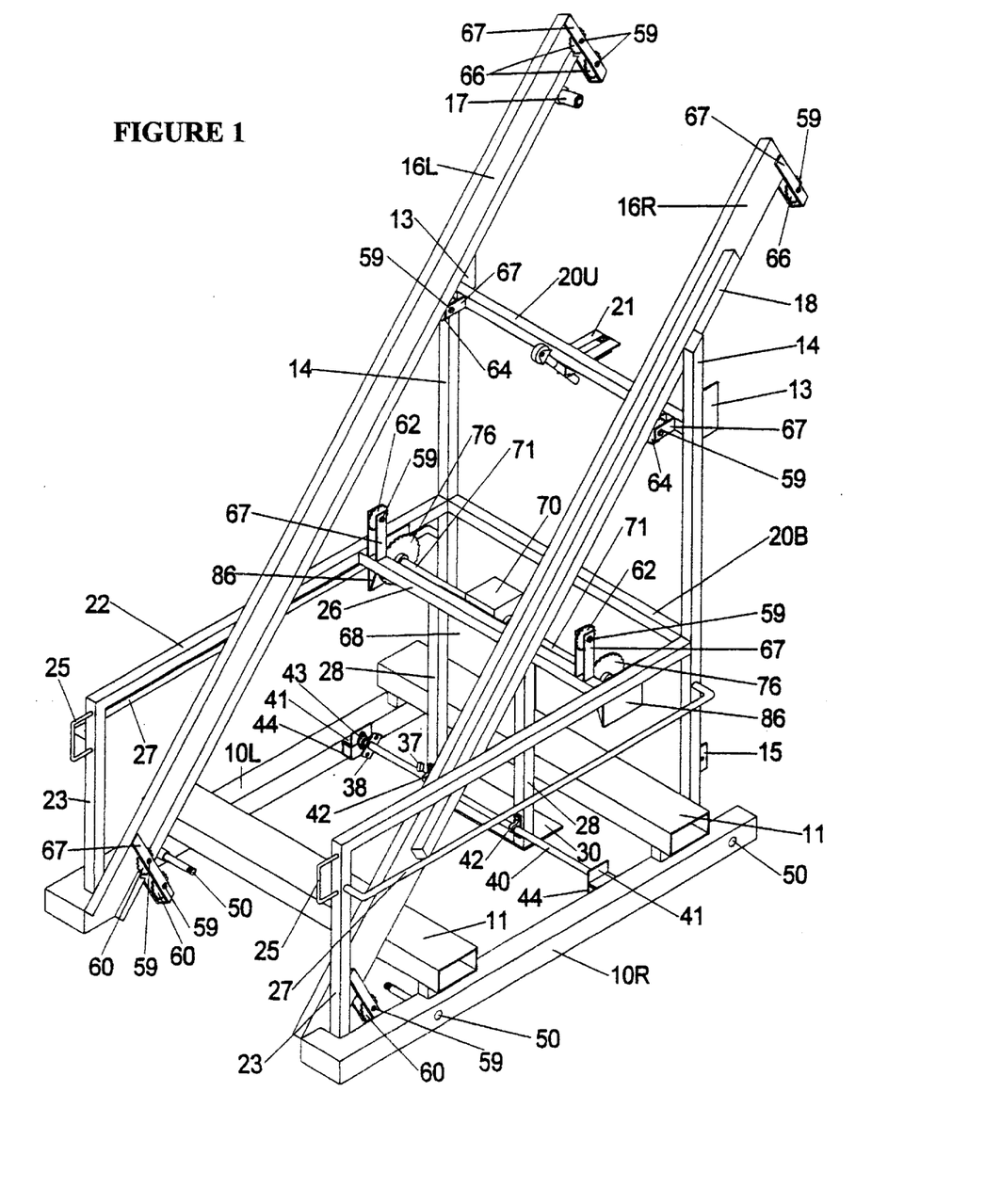
FIG. 1 is an isometric view of linear incline lift and dump device.

Preferred Embodiment—Description
FIG. 1. Isometric View of Linear Incline Lift and Dump Device FIG. 1 shows an isometric view of linear incline lift and dump device. A base 10L(left) and a base 10R(right) rigidly attach to a lifting connector 11. The bottom of a vertical support 14 attaches to lifting connector 11, and the top of vertical support 14 attaches to a rail stiffener 18. Near the bottom of vertical support 14 is a trailer attachment aperture 15. Near the top of vertical support 14 is a bumper 13. Rail stiffener 18 attaches to a incline rail 16L(left) and a incline rail 16R(right). A dump initiator 17 mounts to incline rail 16L(left) and incline rail 16R(right). A sprocket mounting plate 67 attaches to the top of incline rail 16L(left) and 16R(right). A top rail sprocket 66 mounts to sprocket mounting plate 67 with a sprocket bolt 59. Sprocket mounting plate 67 mounts near the bottom of incline rail 16L(left) and 16R(right). A bottom rail sprocket 60 attaches to sprocket mounting plate 67 with sprocket bolt 59. A rear horizontal brace 20B(bottom) and a rear horizontal brace 20U(upper) attach to vertical support 14. A eye bracket 21 and a hopper return roller 29 attach to horizontal brace 20U(upper). Sprocket mounting plate 67 attaches near each end of horizontal brace 20U(upper). A brace sprocket 64 mounts to sprocket mounting plate 67 by sprocket bolt 59. A vertical guard 23 attaches to base 10L(left) and 10R(right) and a horizontal side brace 22. Horizontal side brace 22 attaches to rail stiffener 18 and vertical support 14. A shaft end mounting plate 86 attaches to horizontal side brace 22. A pull handle 25 mounts near the top of vertical guard 23. A side guard 27 mounts to vertical support 14 and vertical guard 23. A gearmotor horizontal support 26 attaches to horizontal side brace 22. Sprocket mounting plates 67 attach to horizontal support 26. A mid brace sprocket 62 mounts to sprocket mounting plate 67 with sprocket bolt 59. A gearmotor vertical support 28 is attached to gearmotor horizontal support 26. A gearmotor mounting plate 68 attaches to gearmotor vertical support 28. A gearmotor 70 mounts to gearmotor mounting plate 68. A drive shaft 71 installs through gearmotor 70. Drive shaft 71 ends attach to shaft end mounting plate 86. A drive sprocket 76 mounts on drive shaft 71. A jack mounting plate 30 attaches to the bottom of gearmotor vertical support 28. A shaft 40 mounts to gearmotor vertical support 28 with bearing block 42. Ends of shaft 40 attach by a end bearing block 43. End bearing block 43 anchors to base 10L(left) and 10R(right)through a mounting angle 41 and a mounting block 44. A wheel safety switch tab 37 and a shaft tab 38 attach to shaft 40. A wheel mounting shaft 50 mounts at front and rear in base 10L(left) and base 10R(right).

Figure 2:
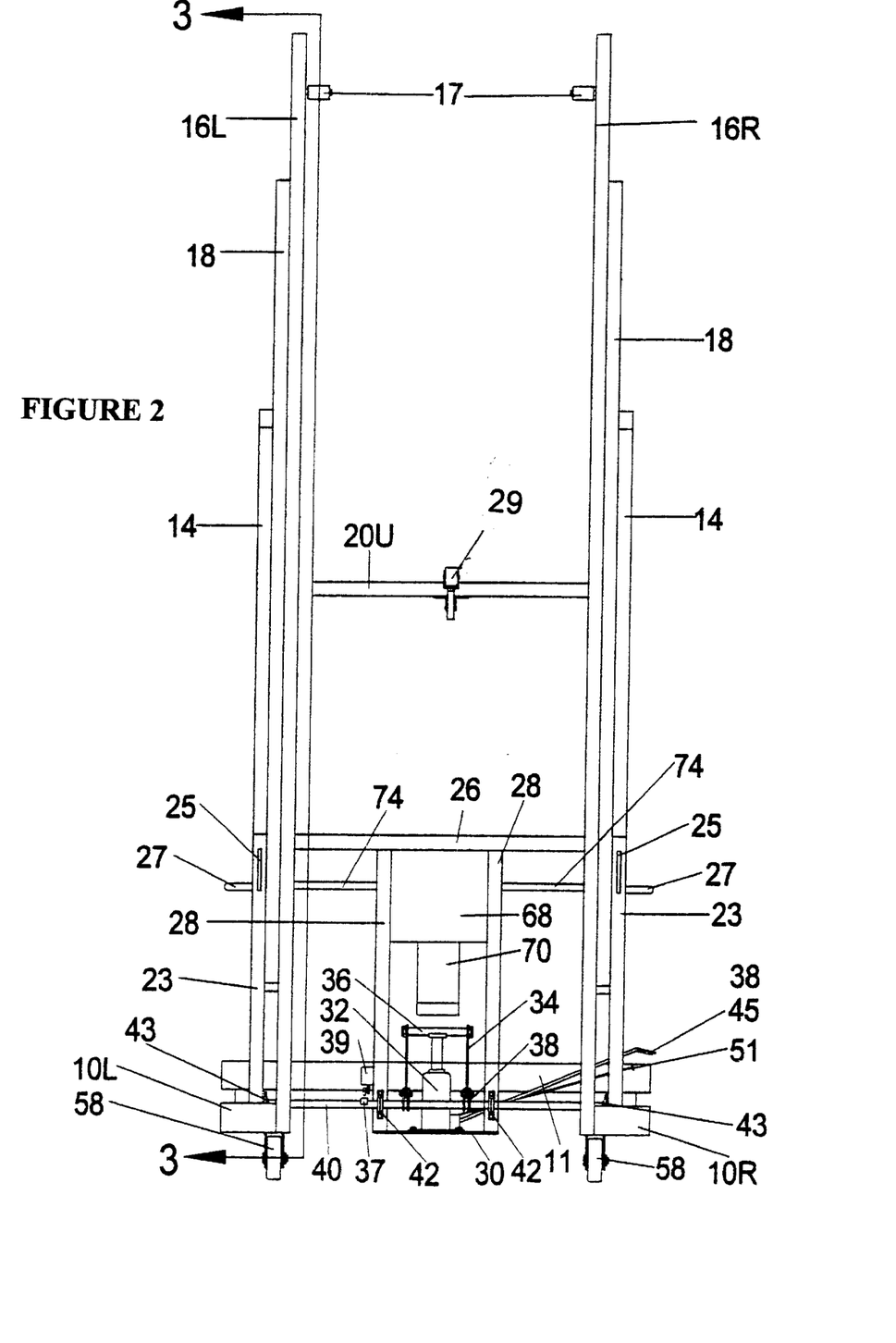
FIG. 2 is a front view of linear incline lift and dump device.

FIG. 2. Front View of Linear Incline Lift and Dump Device

FIG. 2 shows a front view of linear incline lift and dump device. In addition, front view introduces items not shown in FIG. 1. A lifting connector 11 attaches to a base 10L (left) and 10R(right). A jack 32 mounts to a jack mounting plate 30. A connector rod 36 attaches to top of jack 32. A connector plate 34 attaches to connector rod 36. Shaft 40 attaches to connector plate 34 through shaft tab 38. A shaft 40 midsection mounts to a gearmotor vertical support 28 with a bearing block 42. Shaft 40 ends attach to base 10L(left) and 10R(right) through a end bearing block 43. A jack extension lever 45 mounts to jack 32. A jack extension release rod 51 attaches to jack 32. A gearmotor mounting plate 68 mounts to gearmotor vertical support 28 and a gearmotor horizontal supports 26. A gearmotor 70 attaches to gearmotor mounting plate 68. A wheel safety switch tab 37 attaches to shaft 40. A safety switch 39 mounts to gearmotor vertical support 28. A pull handle 25 mounts to top portion of a vertical guard 23 and the bottom portion of vertical guard 23 attaches to base 10L(left) and 10R(right). Bottom of vertical support 14 attaches to base 10L(left) and 10R (right), and top of vertical support 14 attaches to a rail stiffener 18. A side guard 27 mounts to vertical support 14 and vertical guard 23. Ends of a horizontal brace 20U(upper) connect to vertical support 14. Rail stiffener 18 mounts to a incline rail 16L(left) and 16R(right). A hopper return roller 29 mounts to horizontal brace 20U(upper). A dump initiator 17 mounts to incline rail 16L(left). A drive shaft 71 shows in this Fig. and drive shaft 71 placement through gearmotor 70 shows in FIG. 1. A wheel 58 shows in this FIG. 2 and wheel 58 attachment shows in FIG. 3.

Figure 3:
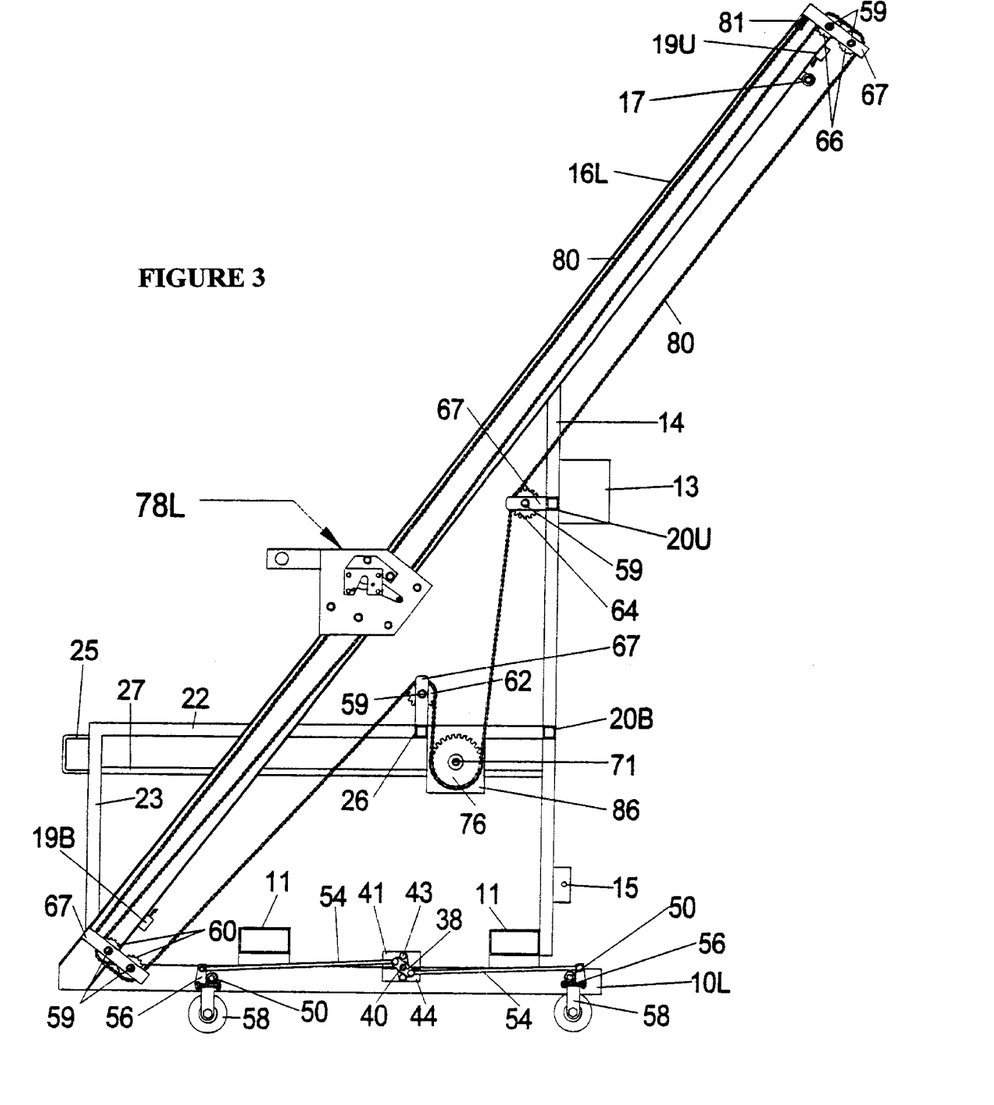
FIG. 3 is a left hand view section of linear incline lift and dump device.

FIG. 3 Left Hand View Section of Linear Lift and Dump Device

FIG. 3 is a left hand view section of linear incline lift and dump device. A roller lifting component 78L(left) positions on a incline rail 16L(left). A movement sensing device 19B(bottom) attaches near the bottom of incline rail 16L (left). A dump initiator 17 and a movement sensing device 19U(upper) attach near the top of incline rail 16L(left). A vertical support 14, a lifting connector 11, a vertical guard 23, and incline rail 16L(left) attach to a base 10L(left). A horizontal side brace 22 attaches to vertical support 14 and the top of vertical guard 23. A side guard 27 attaches to vertical support 14 and vertical guard 23. A pull handle 25 mounts to vertical guard 23. A gearmotor horizontal support 26 attaches to horizontal side brace 22. A bumper 13 mounts near the top of vertical support 14. A trailer attachment aperture 15 is near the bottom of vertical support 14. A rear horizontal brace 20B(bottom) and 20U(upper) attach to vertical support 14. One end of a chain 80 anchors to the bottom of incline rail 16L(left), feed through roller lifting component 78L(left), to a bottom rail sprocket 60, and continues to a mid brace sprocket 62. Bottom rail sprocket 60 attaches to incline rail 16L(left) by a sprocket mounting plate 67 with a sprocket bolt 59. Mid brace sprocket 62 is attached to a gearmotor horizontal brace 26 by sprocket mounting plate 67 with sprocket bolt 59. A shaft end mounting plate 86 mounts to horizontal side brace 22. From mid brace sprocket 62 chain 80 continues around a drive sprocket 76 to a upper brace sprocket 64. Upper brace sprocket 64 is attached to horizontal brace 20U(upper) by sprocket mounting plate 67 with sprocket bolt 59. Chain 80 then feeds around a top rail sprocket 66. Top rail sprocket 66 is attached to incline rail 16L(left) by sprocket mounting plate 67 with sprocket bolt 59. From top rail sprocket 66 chain 80 feeds through roller lifting component 78L(left), and is attached at the top of incline rail 16L(left) through a chain shock absorber 81. Drive sprocket 76 positions on a drive shaft 71. A shaft 40 end mounts to a mounting angle 41 and a mounting block 44 through a end bearing block 43. Mounting angle 41 and mounting block 44 anchors to base 10L(left). A pushrod 54 connects to shaft tab 38 that mounts on shaft 40, and attaches to a wheel rotating plate 56 positioned on a wheel mounting shaft 50. A wheel 58 mounts to wheel rotating plate 56.

Figure 4:
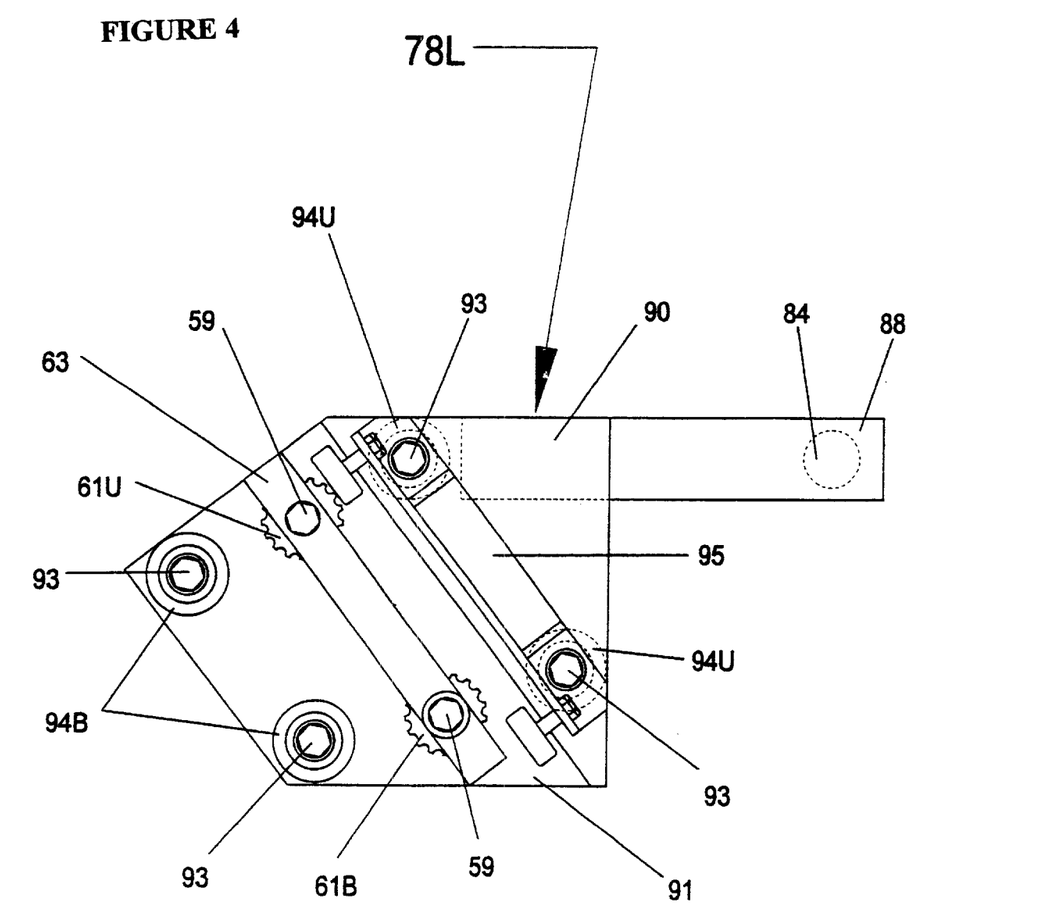
FIG. 4 is a left and right hand view of roller lifting component 78L.

FIG. 4. Left and Right Hand View of Roller Lifting Component

FIG. 4 shows left and right hand views of a roller lifting component 78L(left). Roller lifting component comprises a roller lifting extension arm 88 in which a outside plate 90 and a inside plate 91 attach. A hopper latch 92 mounts to inside plate 91 with roller bolt 93 and sprocket bolt 59. A hopper shaft 84 attaches through roller lifting extension arm 88. A roller 94B(bottom) attaches to inside plate 91 by a roller bolt 93. A roller guide assembly 95 attaches to inside plate 91 by roller bolt 93. A roller 94U(upper) attaches to inside plate 91 and outside plate 90 through roller bolt 93. A lifting sprocket attachment plate 63 attaches to lifting plate 91. Lifting sprockets 61B(bottom) and 61U(upper) attach to lifting sprocket attachment plate 63 by a sprocket bolt 59.

Figure 5:
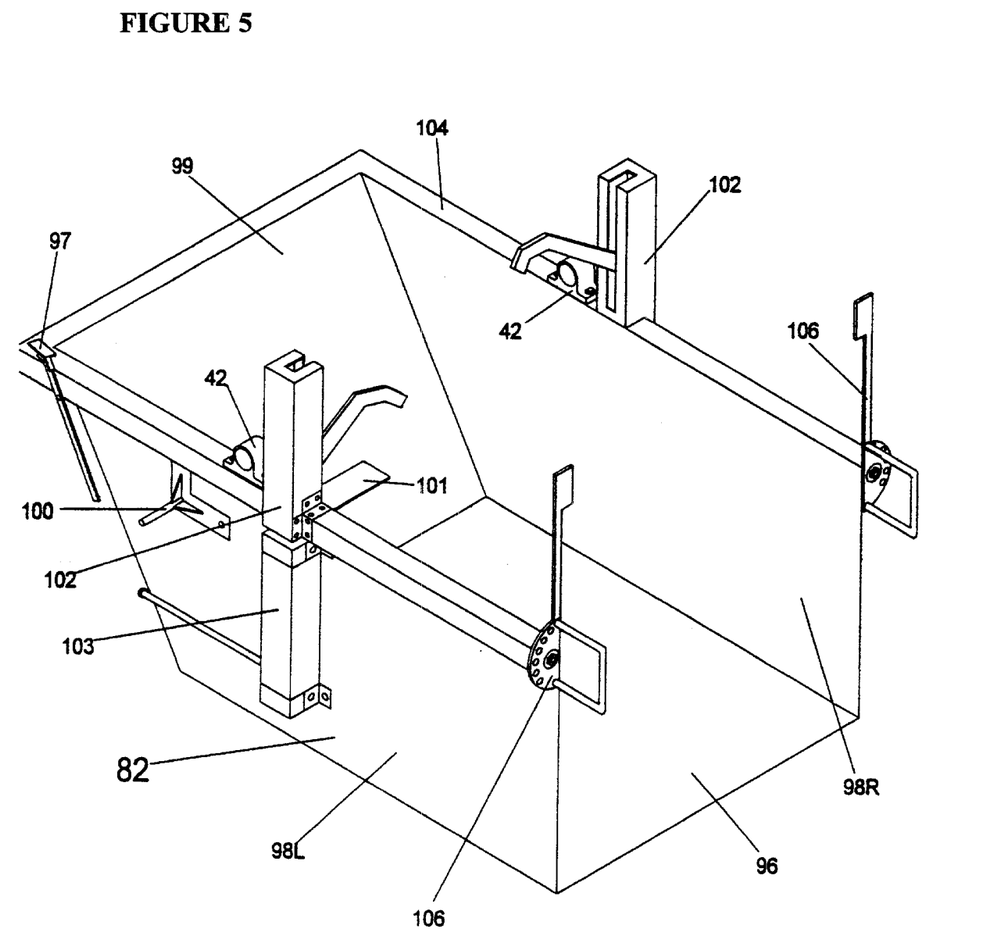
FIG. 5 is an isometric view of lifting hopper.

FIG. 5. Isometric View of Lifting Hopper

FIG. 5 shows an isometric view of the lifting hopper. A lifting hopper 82 consists of a hopper bottom plate 96, a hopper side 98L(left), a hopper side 98R(right), and a hopper back 99. A hopper rim 104 attaches to the top of hopper side 98L(left), hopper side 98R(right), and hopper back 99. A bearing block 42 mounts to hopper rim 104. Lifting hopper 82 attaches to a hopper shaft 84 through bearing block 42. Hopper shaft 84 shows in FIG. 4 and FIG. 5. A load securing mechanism 102, and a latch release lever 97 attaches to hopper rim 104. A securing mechanism actuator 103 and a hopper latch receiver 100 attach to hopper side 98L(left). A rear hopper load securing mechanism 106 mounts to hopper rim 104. A front load securing plate 101 attaches to hopper back 99.

Figure 6:
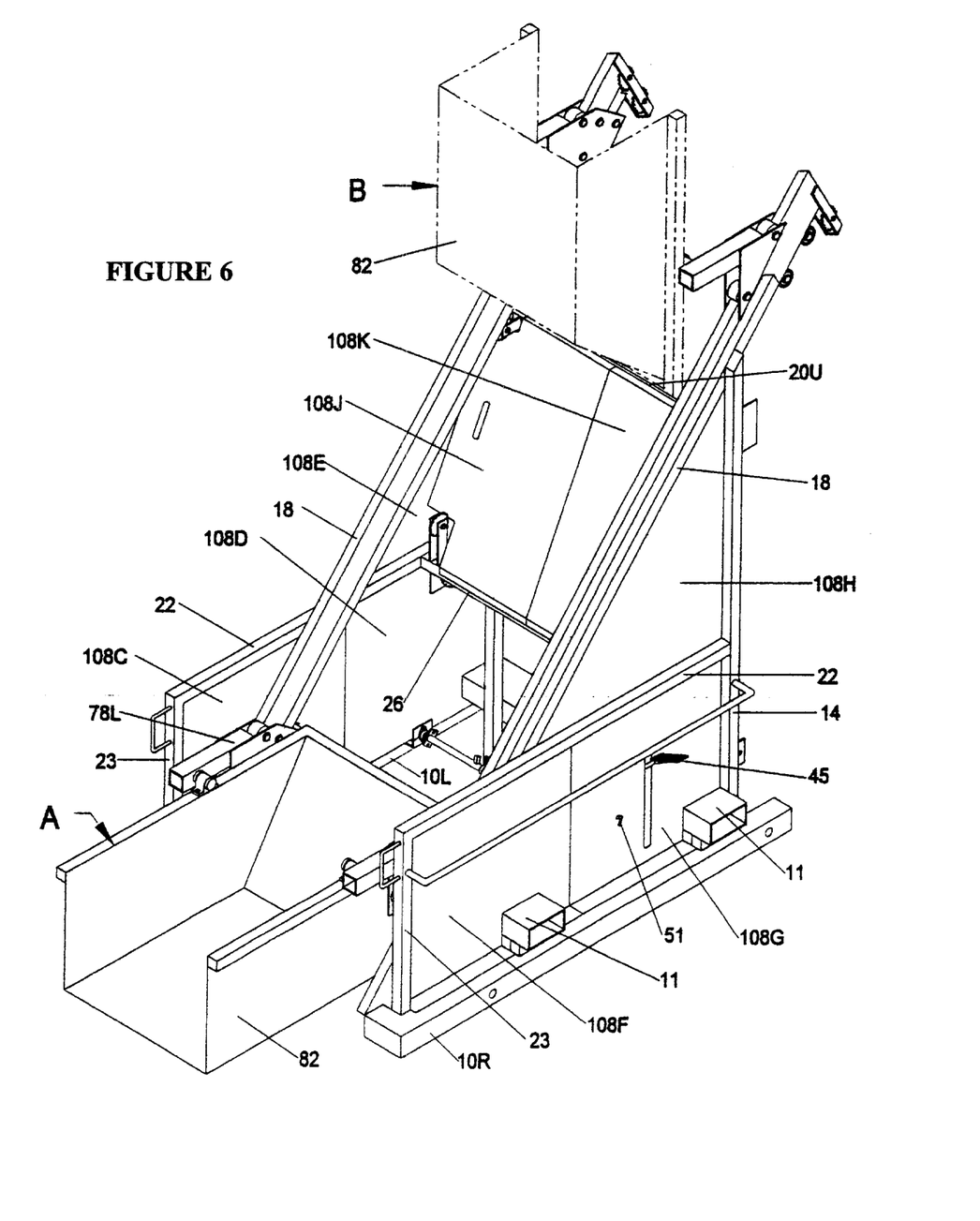
FIG. 6 is an isometric view of linear incline lift and dump device with lifting hopper and protective enclosures.

FIG. 6. isometric view of Linear incline Lift and Dump Device Showing Lifting Hopper and Protective Sides FIG. 6 isometric view of linear incline lift and dump device shows lifting hopper in two positions, and protective enclosures attached. Hopper load securing mechanisms show on previous drawing FIG. 5. A lifting hopper 82 at position A is in load position. At location B hopper 82 shows dump position by phantom lines. Parts pertaining to the attachment of protective enclosures and position A and B of lifting hopper 82 introduced in this FIG. 6. A protective enclosure 108C and a protective enclosure 108D attach to a base 10L(left), a horizontal side brace 22, and a vertical guard 23. A protective enclosure 108F and a protective enclosure 108G attach to a base 10R(right), a vertical support 14, a horizontal side brace 22, and a vertical guard 23. A protective enclosure 108E and a protective enclosure 108H attach to a vertical support 14, a rail stiffener 18, and a horizontal side brace 22. A protective enclosure 108J and a protective enclosure 108K attach to a rear horizontal support 20U(upper) and a gearmotor horizontal support 26. A lifting connector 11, a extension lever 45, and a extension release rod 51 protrude through protective enclosure 108F and 108G.

Preferred Embodiment—Operation

As shown in FIG. 1 isometric view of the linear incline lift and dump device, a base 10L(left) and a base 10R(right) function as attachment components for; a wheel mounting shaft 50, a mounting angle 41, a vertical guard 23, a incline rail 16L(left) and 16R(right), a base connector 11, and a vertical support 14. A pull handle 25 attaches to vertical guard 23 to asset the operator in positioning of the lift and dump device. A stiffener 18 attaches to incline rail 16L(left) and 16R(right) provides longitudinal stiffening for said incline rails. Rail stiffener 18 is also an attachment point for vertical support 14 and a horizontal side brace 22. A bumper 13 attached near the top of vertical support 14 prevents the material or debris receptacle from interfering with the operation of the dumping device. A trailer attachment aperture 15 is for connecting the dumping device to a transportation trailer. A rear horizontal brace 20B(bottom) and a rear horizontal brace 20U(upper) connect vertical supports in a parallel position. Rear horizontal brace 20U(upper) is also a point of attachment for a sprocket mounting plate 67 to which a brace sprocket 64 connects by a sprocket bolt 59. A eye bracket 21 functions as an attachment point for transportation securing of the lift and dump device. A hopper return roller 29 causes the lifting hopper 82 to rotate to the latched load position as the hopper traverses down incline rails 16L and 16R. Lifting hopper 82 shown in FIG. 5 and FIG. 6. Horizontal side brace 22 connects said vertical guard, rail stiffener, and vertical supports. A side guard 27 functions to protect the dumping device and to aid in repositioning the device. Horizontal side brace 22 also serves as a point of attachment for a gearmotor horizontal support 26 and a shaft end mounting plate 86. Gearmotor horizontal support is a point of attachment for a gearmotor vertical support 28, and sprocket mounting plate 67 in which mid brace sprocket 62 attaches by sprocket bolt 59. Gearmotor vertical support is attachment point for a gearmotor mounting plate 68, and a jack mounting plate 30. A gearmotor 70 attached to gearmotor mounting plate 68 provides motive force to rotate a drive shaft 71 and a drive sprocket 76. A shaft 40 that is part of the wheel extension assembly rotates freely through a bearing block 42 and a end bearing block 43. A shaft tab 38 functions as an attachment point for wheel components shown in FIG. 2 and FIG. 3. A wheel mounting shaft 50 is for wheel component attachment. A safety switch tab 37 actuates a safety switch 39 as shaft 40 rotates. Safety switch 39 shown in FIG. 2. A hopper dump initiator 17 positioned near the top of incline rail 16L causes a lifting hopper 82 to rotate to the dump position when lifting hopper 82 comes in contact with hopper dump initiator. Sprocket mounting plate 67 attached to the top of and near the bottom of incline rail is for attachment of a top rail sprocket 66 and a bottom rail sprocket 60 by sprocket bolt 59.

FIG. 2 front view of linear incline lift and dump device will describe operation and or function of components not shown or introduced in FIG. 1. A jack 32 attached to a jack mounting plate 30 supplies the force and range of movement required to rotate a shaft 40. Force and range of movement convey to shaft 40 via a connector plate 34 that attaches to a shaft tab 38, and a connector rod 36 that mounts at the top of jack 32. By activating the extension lever 45 and a extension release rod 51, the jack force and range of motion increases or decreases. A safety switch 39 actuates by a safety switch tab 37 as shaft 40 rotates. Safety switch 39 prevents operation of dump device when a wheel 58 extends.

FIG. 3 left hand section of linear incline lift and dump device will describe operation and or function of components not shown or introduced in FIG. 1 and FIG. 2. A pushrod 54 transmits a force and range of motion from jack, through a tab 38, to a wheel rotating plate 56 causing wheel rotating plate 56 to rotate about a wheel mounting shaft 50. A wheel 58 attached to wheel rotating plate will extend or retract as a resultant of this applied force and range of motion. When wheel 58 extends dump device will be in portable mode and when wheel retracts the device will be in operation mode. A motion sensing device 19B(bottom) attached near the bottom of a incline rail 16L(left) causes the downward travel of a roller lifting component 78L(left) to stop when activated by roller lifting component. A motion sensing device 19U(upper) attached near the top of incline rail 16L causes the upward travel of roller lifting component to stop when activated by roller lifting component. A chain 80 is open ended and routed around sprockets as shown. One end of chain 80 attaches near the bottom of incline rail, and the other end attaches near the top of rail through a chain shock absorber 81. As a gearmotor drive sprocket 76 rotates a resultant force a conveys to the chain causing roller lifting component 82 to traverse in linear fashion along inclined rail.

FIG. 4 left and right hand views show a roller lifting component 78L(left). A outside plate 90, a inside plate 91, and roller lifting extension arm 88 comprises the main body of the roller lifting component. A roller 94B and a roller 94U permit roller lifting component 82 to traverse freely along a incline rail 16L(left) and 16R(right). Incline rail shows in FIG. 1, FIG. 2, FIG. 3, and FIG. 7. A roller guide assembly 95 keeps roller lifting component aligned as it traverses along incline rail. A lifting sprocket 61B(bottom) and 61U (upper) function as attachment points for a chain 80. A latch 92 keeps the lifting hopper from rotating unintentionally as the lifting component traverses along the incline rail. A hopper shaft 84 is for attachment of a lifting hopper 82. Lifting hopper shown in FIG. 5. A lifting hopper 82 as shown in FIG. 6 attaches to a hopper shaft 84 by a bearing block 42. Bearing block 42 attached to lifting hopper rotates freely on hopper shaft 84.

FIG. 5 isometric view shows a lifting hopper 82 with latching and load securing components attached. Hopper bottom plate 96, hopper back 99, and hopper sides 98L and 98R attach together to form the lifting hopper. A hopper rim 104 mounted to the lifting hopper as shown provides structural reinforcement. Hopper rim also is for the attachment of other components. A bearing block 42 mounts to the hopper rim. This bearing block attaches to a hopper shaft 84. The hopper then rotates on the hopper shaft as it dumps. A hopper latch receiver 100 mounted to the side of lifting hopper connects to a latch 92 and keeps the hopper from rotating unintentionally. A latch release lever 97 activates latch mechanism and hopper then rotates to dump position. A securing mechanism actuator 103 activates a securing mechanism 102 to secure a tilt truck, cart, or wheel barrow placed in the hopper. A rear hopper load securing mechanism 106 is self locking. This mechanism keeps carts, tilt trucks, and wheel barrows from rolling out of lifting hopper. To change position of the mechanism, pull, rotate to the new position, then release. A front load securing plate 101 assists in securing loads.

FIG. 6 isometric view shows linear incline lift and dump device with protective covers 108C, 108D, 108E, 108F, 108G, 108H, 108J, 108K, and a lifting hopper 82 attached. Protective covers enclose components and moving parts that could be subject to damage, and or cause injury to the operator. Lifting hopper traverses from the load position A, up a incline rail 16L(left) and 16R(right) to dump position B. Lifting hopper in dump position B shows in phantom lines.

Conclusions, Ramifications, and Scope

Accordingly, it the dumping device of this invention readily accepts various carts, tilt trucks, wheel barrows, and the like without modifications to the same. In addition, no changing of components or the use of special attachments is required of the lifting hopper to accommodate various carts, tilt trucks, wheel barrows, and the like. Furthermore, an additional advantage of the invention is to reduce redundant manual transferring or handling of material or debris in the process of delivering and dumping material or debris into a receptacle for the same.

Although the description above contains many specificity's, these should not be construed as limiting the scope of the invention but as merely providing illustrations of some presently preferred embodiments of this invention. Various other embodiments and ramifications are possible within its scope. For example, the structural components of the dumping device can arrange differently. The angle of the incline rails can increase or decrease. Anyone skilled in the art of fabrication can vary shapes, sizes, and attachment methods of components to construct this invention. The material used in the fabrication of the invention can be ferrous, non-ferrous, composite, or any combination thereof. The source of motive force to operate the invention can be electrical, hydraulic, pneumatic, internal combustion or any combination thereof. Delivery of motive force to roller lifting component is drive shaft, chain, sprockets, and related components. In addition, alternate means of delivery of motive force such as, cable, pulleys, hydraulics, pneumatics, or any combination thereof may be utilized in this invention. Thus the scope of the invention should be determined by the appended claims and their legal equivalents, rather than by the examples given.

What is claimed is:

1. A linear incline lift and dump device comprising:
    a linear incline structure that provides a linear traversing means for lifting and dumping carts, tilt trucks, or wheel barrows, said linear incline structure comprising:
    a left base member;
    a left incline rail defined by first and second ends, said rail extending upwardly at an angle between vertical and horizontal from an attachment point formed at said first end and extending to said left base member;
    a right base member;
    a right incline rail defined by first and second ends, said rail extending upwardly at an angle between vertical and horizontal from an attachment point formed at said first end and extending to said right base member;
    right and left vertical support members, said right vertical support member extending from said right incline rail to said right base member, and said left vertical support member extending from said left incline rail to said left base member;
    a plurality of retractable wheels extendable downwardly from said right and left base members responsive to actuation of an extension lever;
    a lifting hopper defined by a bottom panel, a right side panel defined by an upper rear corner, a left side panel defined by an upper rear corner, an angled front panel and an open back side, said hopper configured to traverse said incline rails from a load position to a dump position, said lifting hopper configured to accept the carts, tilt trucks, or wheel barrows by rolling or otherwise pushing said carts, tilt trucks or wheel barrows through said open back side, said lifting hopper further comprising, at least one securing mechanism for releasibly securing the carts, tilt trucks, or wheel barrows within said hopper, and still further comprising at least one rotatable restraining arm configured to cooperate with a handle of, a said wheel barrow to restrain a said wheel barrow in said hopper, each said arm extending from the vicinity of one of said corners; and hopper moving means for causing said lifting hopper to traverse from said load position to said dump position, said moving means comprising at least one chain attached to said hopper, a plurality of sprockets engaging said chain and at least one gear motor for driving said chain.

2. The linear incline lift and dump device of claim 1, wherein said hopper moving means further comprises a pair of roller lifting components, each component in said pair positioned on said incline rails to traverse from said first ends to said second ends in linear fashion in cooperation with said at least one chain.

3. The linear incline lift and dump device of claim 2 wherein said lifting hopper is attached to each said roller lifting component through means for axial rotation of said lifting hopper.

4. The linear inline lift and dump device of claim 3 wherein each said roller lifting component comprises a shaft for axial rotation of said lifting hopper.

5. The linear incline lift and dump device of claim 4, further comprising:

a pair of lifting connectors extending between said left and right base members.

6. The linear incline lift and dump device of claim 5, further comprising:

a trailer attachment aperture for attaching a trailer attachment member thereto.

7. The linear incline lift and dump device of claim 1, further comprising:

a pair of lifting connectors extending between said left and right base members.

8. By The linear incline lift and dump device of claim 7, further comprising:

a trailer attachment aperture for attaching a trailer attachment member thereto.

* * * * *